United States Patent
Abe et al.

(10) Patent No.: US 10,347,392 B2
(45) Date of Patent: Jul. 9, 2019

(54) FLUORINATED INSULATED ELECTRIC WIRE

(71) Applicant: AGC Inc., Chiyoda-ku (JP)

(72) Inventors: Masatoshi Abe, Chiyoda-ku (JP); Takashi Sato, Chiyoda-ku (JP); Tomoya Hosoda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 121 days.

(21) Appl. No.: 15/429,448

(22) Filed: Feb. 10, 2017

(65) Prior Publication Data

US 2017/0154707 A1    Jun. 1, 2017

Related U.S. Application Data

(63) Continuation of application No. PCT/JP2015/073405, filed on Aug. 20, 2015.

(30) Foreign Application Priority Data

Aug. 27, 2014 (JP) .................. 2014-173139

(51) Int. Cl.
| | |
|---|---|
| *H01B 3/44* | (2006.01) |
| *H01B 7/02* | (2006.01) |
| *B29C 48/15* | (2019.01) |
| *B29C 48/30* | (2019.01) |
| *B29C 48/34* | (2019.01) |
| *B29L 31/34* | (2006.01) |
| *H01B 13/14* | (2006.01) |
| *B29C 48/154* | (2019.01) |

(52) U.S. Cl.
CPC ........... *H01B 7/0275* (2013.01); *B29C 48/15* (2019.02); *B29C 48/154* (2019.02); *B29C 48/30* (2019.02); *B29C 48/34* (2019.02); *H01B 3/441* (2013.01); *H01B 3/445* (2013.01); *B29L 2031/34* (2013.01); *H01B 7/02* (2013.01); *H01B 13/14* (2013.01)

(58) Field of Classification Search
USPC .................................. 174/110 V
See application file for complete search history.

(56) References Cited

U.S. PATENT DOCUMENTS

| | | | | | |
|---|---|---|---|---|---|
| 5,057,345 | A | * | 10/1991 | Barrett ................. | B29C 61/003 252/511 |
| 5,281,371 | A | * | 1/1994 | Tamura ............... | B29C 47/0038 264/1.33 |
| 2002/0002216 | A1 | * | 1/2002 | Tooley ................. | C08K 9/02 523/210 |
| 2006/0293459 | A1 | * | 12/2006 | Yoshimoto ............ | H01B 3/441 525/199 |
| 2015/0357084 | A1 | * | 12/2015 | Masuda ................ | H01B 7/292 428/379 |

FOREIGN PATENT DOCUMENTS

| | | |
|---|---|---|
| JP | 5-239249 | 9/1993 |
| JP | 2008-257969 | 10/2008 |
| JP | 4591352 | 12/2010 |
| JP | 2011-108492 | 6/2011 |
| JP | 2011-253647 | 12/2011 |
| WO | WO 2013/125468 A1 | 8/2013 |

OTHER PUBLICATIONS

EPO (Daikin). JP2011253647_English_Translation. Dec. 15, 2011. JPO.*
EPO (Fujikura). JP2008257969_English_Translation.Oct. 23, 2008. JPO.*
International Search Report dated Oct. 20, 2015 in PCT/JP2015/073405 filed on Aug. 20, 2015.

* cited by examiner

*Primary Examiner* — Dimary S Lopez Cruz
*Assistant Examiner* — Muhammed Azam
(74) *Attorney, Agent, or Firm* — Oblon, McClelland, Maier & Neustadt L L P

(57) ABSTRACT

An insulated electric wire comprising a conductor and an insulating layer covering the conductor, wherein the insulating layer comprises a fluorinated copolymer (A) having units based on tetrafluoroethylene and units based on a perfluoroalkyl vinyl ether, the content of the units based on a perfluoroalkyl vinyl ether is from 0.1 to 1.9 mol % to the total units in the fluorinated copolymer (A); MRF of the fluorinated copolymer (A) as measured by the method in accordance with ASTM D-3307 is at least 0.1 and less than 15; the melting point of the fluorinated copolymer (A) is at least 260° C.; and the ratio of the thickness Di of the insulating layer to the diameter Dc of the conductor (Di/Dc) is less than 0.5.

9 Claims, No Drawings

FLUORINATED INSULATED ELECTRIC WIRE

TECHNICAL FIELD

The present invention relates to an insulated electric wire and its production process.

BACKGROUND ART

A fluorinated copolymer is excellent in heat resistance, flame retardance, chemical resistance, weather resistance, non-tackiness, low friction property and low dielectric property. It is, therefore, used in a wide range of fields including e.g. a coating material for heat-resistant non-flammable electric wires, a corrosion-resistant piping material for chemical plants, an agricultural plastic greenhouse material, a release coating material for kitchen utensil, etc.

Particularly, as compared with a partially fluorinated type ethylene-tetrafluoroethylene copolymer (hereinafter referred to also as "ETFE"), a polyfluorinated vinylidene (hereinafter referred to also as "PVdF"), etc., perfluorinated copolymers such as a polytetrafluoroethylene (hereinafter referred to also as "PTFE") and a tetrafluoroethylene/perfluoroalkyl vinyl ether copolymer (hereinafter referred to also as "PFA") are excellent in chemical resistance but are poor in elasticity and abrasion resistance.

It has been tried to improve the abrasion resistance of a perfluorinated copolymer such as PTFE or PFA by forming a polymer alloy of the fluorinated copolymer with another resin so as to be used under an environment in which the abrasion resistance is desired such that the fluorinated copolymer may be contained in an insulating layer for an insulated electric wire.

For example, in the electric wire coating material described in Patent Document 1, a fluorinated copolymer to be contained in the material is formed into a polymer alloy with a thermoplastic resin which is harder than the fluorinated copolymer and is excellent in the mechanical strength in order to improve the abrasion resistance.

On the other hand, it has been desired to reduce the size and weight of vehicle devices, etc. to be used for automobiles, railroads, airplanes, etc. Therefore, it is desired to reduce the thickness of an insulating layer for an insulated electric wire to be used in the vehicle devices.

For example, Patent Document 2 discloses an insulated electric wire having an insulating layer comprising PFA having at least a predetermined value of MFR (abbreviation of Melt Flow Rate) and at least a predetermined content of constitution units based on a perfluoropropyl vinyl ether, whereby the thickness is reduced.

PRIOR ART DOCUMENTS

Patent Documents

Patent Document 1: WO2013/125468
Patent Document 2: Japanese Patent No. 4591352

DISCLOSURE OF INVENTION

Technical Problem

However, as compared with a case where a polymer is not alloyed with a thermoplastic resin, in the case of the polymer alloy described in Patent Document 1, the molten tension at a time of molding is small, and if an insulated electric wire of which an insulating layer is made to be thin by using the polymer alloy is produced, the surface roughness of the insulating layer is high, and the abrasion resistance deteriorates. Thus, in order to improve the abrasion resistance, it is necessary to make an insulating layer thick, and thereby the insulating layer cannot be thin.

On the other hand, in the case of the insulated electric wire described in Patent Document 2, the insulating layer is made to be thin, however, the abrasion resistance is insufficient to be used for vehicle devices, etc. in automobiles, railroads, airplanes, etc.

Accordingly, it is an object of the present invention to provide an insulated electric wire having an insulating layer comprising PFA which is excellent in the abrasion resistance, even though the insulating layer is not made to be thick.

Solution to Problem

The present invention provides the following [1] to [9]

[1] An insulated electric wire comprising a conductor and an insulating layer covering the conductor, wherein the insulating layer comprises a fluorinated copolymer (A) having units based on tetrafluoroethylene and units based on a perfluoroalkyl vinyl ether, the content of the units based on a perfluoroalkyl vinyl ether is from 0.1 to 1.9 mol % to the total units in the fluorinated copolymer (A); MRF of the fluorinated copolymer (A) as measured by the method in accordance with ASTM D-3307 is at least 0.1 and less than 15; the melting point of the fluorinated copolymer (A) is at least 260° C.; and the ratio of the thickness Di of the insulating layer to the diameter Dc of the conductor (Di/Dc) is less than 0.5.

[2] The insulated electric wire according to [1], wherein the perfluoroalkyl vinyl ether is perfluoropropyl vinyl ether.

[3] The insulated electric wire according to [1] or [2], wherein the surface roughness (Ra) of the insulating layer is at most 10 μm.

[4] The insulated electric wire according to any one of [1] to [3], wherein the content of the units based on a perfluoroalkyl vinyl ether is from 1.0 to 1.9 mol % to the total units in the fluorinated copolymer (A).

[5] The insulated electric wire according to any one of [1] to [4], wherein the ratio of the thickness Di of the insulating layer (Di/Dc) is at least 0.2 and less than 0.5.

[6] The insulated electric wire according to any one of [1] to [5], wherein the ratio of the thickness Di of the insulating layer (Di/Dc) is at least 0.05 and at most 0.2.

[7] The insulated electric wire according to any one of [1] to [6], which is used as a member for a vehicle.

[8] A process for producing the insulated electric wire as defined in any one of [1] to [7], which has a covering step of covering the conductor with a molten fluorinated copolymer (A) by means of a wire extrusion molding apparatus provided with a die to produce the insulated electric wire, wherein the temperature of the die is at least 320° C. and less than 420° C.

[9] The process according to [8], wherein when draw downing the molten fluorinate copolymer (A) from the die to the conductor, the draw down ratio (DDR) is at least 5.0 and less than 180.

Advantageous Effects of Invention

According to the present invention, it is possible to provide an insulated electric wire having an insulating layer comprising PFA which is excellent in the abrasion resistance, even though the thickness of the insulating layer is not made to be thick.

DESCRIPTION OF EMBODIMENTS

In this specification a "monomer" is meant for a compound having a polymerizable unsaturated bond, i.e. a polymerizable carbon-carbon double bond. A "fluoromonomer" is meant for a monomer having fluorine atom(s) in its molecule, and a "non-fluoromonomer" is meant for a monomer having no fluorine atom in its molecule.

A "(structural) unit" is meant for a unit based on a monomer, which is formed by polymerization of the monomer. The unit may be a unit formed directly by a polymerization reaction or may be a unit having part of a unit of a polymer converted to another structure by treating the polymer.

A "fluorinated polymer" is a polymer consisting of (structural) units based on one type of a fluorinated monomer. A "fluorinated copolymer" is a copolymer comprising at least 2 types of (structural) units, wherein at least one type of structural units are structural units based on a fluorinated monomer.

[Insulated Electric Wire]

The insulated electric wire of the present invention comprises a conductor and an insulating layer covering the conductor.

(Conductor)

The material of the conductor is not particularly restricted and may, for example, be one including copper, tin, silver, etc. Among them, copper is preferred. The diameter of the conductor is preferably from 10 μm to 3 mm.

(Insulating Layer)

The insulating layer comprises a fluorinated copolymer (A) comprising units based on tetrafluoroethylene (hereinafter referred to also as "TFE") and units based on a perfluoroalkyl vinyl ether (hereinafter referred to also as "PAVE").

<Fluorinated Copolymer (A)>

The fluorinated copolymer (A) is a fluorinated copolymer comprising units based on TFE and units based on PAVE, namely, PFA.

As PAVE to be contained in the fluorinated copolymer (A), a known PAVE may be used. Among them, from the viewpoint of the thermal stability, $CF_2=CFOR^{f1}$ ($R^{f1}$ is a $C_{1-10}$ perfluoroalkyl group which may have an oxygen atom between carbon atoms) or the like is preferred.

As $CF_2=CFOR^{f1}$, $CF_2=CFOCF_2CF_3$, $CF_2=CFOCF_2CF_2CF_3$ (perfluoropropyl vinyl ether, hereinafter referred to also as "PPVE"), $CF_2=CFOCF_2CF_2CF_2CF_3$, $CF_2=CFO(CF_2)_8F$ or the like may be mentioned. Among them, PPVE is preferred.

The fluorinated copolymer (A) may contain at least one monomer other than the units based on TFE and the units based on PAVE, so far as the essential properties are not impaired.

Such other monomer may, for example, be a fluoroolefin such as vinyl fluoride, vinylidene fluoride (hereinafter referred to also as "VdF"), trifluoroethylene, chlorotrifluoroethylene (hereinafter referred to also as "CTFE") or hexafluoropropylene (hereinafter referred to also as "HFP"), $CF_2=CFOR^{f2}SO_2X^1$ ($R^{f2}$ is a $C_{1-10}$ perfluoroalkylene group which may have an oxygen atom between carbon atoms, and $X^1$ is a halogen atom or a hydroxy group), $CF_2=CFOR^{f3}CO_2X^2$ ($R^{f3}$ is a $C_{1-10}$ perfluoroalkylene group which may have an oxygen atom between carbon atoms, and $X^2$ is a hydrogen atom or an alkyl group having at most 3 carbons), $CF_2=CF(CF_2)_pOCF=CF_2$ (p is 1 or 2), $CH_2=CX^3(CF_2)_qX^4$ ($X^3$ is a hydrogen atom or a fluorine atom, q is an integer of from 2 to 10, and $X^4$ is a hydrogen atom or a fluorine atom) and a perfluoro(2-methylene-4-methyl-1,3-dioxolane).

Among them, at least one type selected from the group consisting of VdF, CTFE, HFP and $CH_2=CX^3(CF_2)_qX^4$ is preferred, and HFP is more preferred.

$CH_2=CX^3(CF_2)_qX^4$ may, for example, be $CH_2=CH(CF_2)_2F$, $CH_2=CH(CF_2)_3F$, $CH_2=CH(CF_2)_4F$, $CH_2=CF(CF_2)_3H$ or $CH_2=CF(CF_2)_4H$ and is preferably $CH_2=CH(CF_2)_4F$ or $CH_2=CH(CF_2)_2F$.

Another monomer other than the above exemplified monomers may, for example, be an adhesive functional group-containing monomer (AM monomer).

AM monomer may, for example, be an unsaturated hydrocarbon monomer having a functional group such as an amido group, a hydroxy group or an amino group in addition to a carbonyl group-containing group. As specific examples of AM monomer, a dicarboxylic acid such as itaconic acid, citraconic acid, 5-norbornene-2,3-dicarboxylic acid or maleic acid or an acid anhydride such as itaconic acid anhydride, citraconic acid anhydride, 5-norbornene-2,3-dicarboxylic acid anhydride or maleic acid anhydride may be mentioned.

The mass average molecular weight of the fluorinated copolymer (A) is not particularly restricted, and is preferably from 2,000 to 1,000,000.

The content of the units based on TFE in the fluorinated copolymer (A) is preferably from 90.0 to 99.9 mol %, more preferably 95.0 to 99.5 mol %, to the total units in the fluorinated copolymer (A). If the content of the units based on TFE is lower than the above lower limit value, the heat resistance is poor, and if the content is higher than the above upper limit value, the processability is poor.

The content of the units based on PAVE in the fluorinated copolymer (A) is from 0.1 to 1.9 mol % to the total units in the fluorinated copolymer (A). If the content of the units based on PAVE is lower than the above lower limit value, the melting property of the fluorinated copolymer (A) deteriorates. On the other hand, if the content is higher than the upper limit value, the crystallinity of the fluorinated copolymer (A) deteriorates, and the abrasion property and the mechanical strength thereby deteriorate.

The content of the units based on PAVE in the fluorinated copolymer (A) is preferably from 0.3 to 1.9 mol %, more preferably from 1.0 to 1.9 mol %, most preferably from 1.5 to 1.9 mol %, to the total units in the fluorinated copolymer (A).

When the content of the units based on PAVE falls within the above range, the insulating layer is excellent in the surface smoothness and the abrasion resistance. If the content is lower than the above lower limit value, the melting processability deteriorates, and the surface smoothness of the insulating layer deteriorates. On the other hand, if the content is higher than the above upper limit value, the crystallinity of the fluorinated copolymer (A) becomes low, and thereby the abrasion resistance of the insulating layer deteriorates.

The total content of the units based on TFE and the units based on PAVE in the fluorinated copolymer (A) is preferably from 90 to 100 mol %, more preferably from 95 to 100 mol %, to the total units in the fluorinated copolymer (A). If the total content is lower than the above lower limit value, the heat resistance is poor.

MFR of the fluorinated copolymer (A) is at least 0.1 and less than 15. If MFR is lower than the above lower limit value, the molding processability deteriorates, and thereby it is difficult to mold an insulating layer having a low surface roughness. On the other hand, if MFR is higher than the above upper limit value, the binding force among molecules becomes low due to high molecular weight of the fluorinated copolymer (A), and the abrasion resistance of the insulating layer deteriorates.

MFR is preferably at least 1 and less than 14, more preferably at least 2 and less than 13, most preferably at least 3 and less than 12. When MFR falls within the above range, the abrasion resistance of the insulating layer is excellent. If MFR is lower than the above lower limit value, the viscosity of the fluorinated copolymer (A) is too high, the melting workability is poor, melt fraction occurs, and an insulating layer having a high surface roughness is formed. On the other hand, if MFR is higher than the above upper limit value, the abrasion resistance of the insulating layer deteriorates.

Further, MFR in the present invention is a value measured by the method in accordance with ASTM D-3307. MFR in the present invention may be a value obtained by measuring a mass (g) of the fluorinated copolymer (A) flowing out for 10 minutes from a nozzle having a diameter of 2 mm and a length of 8 mm under a load of 49 N at a measuring temperature of 372° C. by using a melt indexer (for example, manufactured by Takara Thermistor Ltd.).

MFR is an index of the molecular weight of the fluorinated copolymer (A) and may be controlled by an amount of a chain transfer agent to be added for preparing the fluorinated copolymer (A).

The melting point of the fluorinated copolymer (A) is at least 260° C., preferably from 260 to 330° C., more preferably from 280 to 320° C., particularly preferably from 290 to 315° C. When the melting point is at least the above lower limit value, mechanical properties such as the abrasion resistance, the tensile strength, the tensile elongation and the elastic coefficient are excellent, and when the melting point is at most the above upper limit value, the molding property is excellent.

The melting point of the fluorinated copolymer (A) may be controlled by the type or the content of structural units of the fluorinated copolymer (A), the molecular weight of the fluorinated copolymer (A) or the like. For example, the higher the proportion of structural units based on tetrafluoroethylene in the fluorinated copolymer (A) is, the higher the melting point tends to be.

The content of the fluorinated copolymer (A) in the insulating layer is preferably from 50 to 100 mass %, more preferably from 85 to 100 mass %. When the content of the fluorinated copolymer (A) in the insulating layer is at least the above lower limit value, the heat resistance, the molding property and the insulating property are excellent.

The surface roughness (Ra) of the insulating layer is at most 10 μm. When the surface roughness (Ra) falls within the above range, the insulated electric wire is excellent in the abrasion resistance.

The surface roughness (Ra) of the insulating layer is preferably at most 10.00 μm, more preferably at most 5 μm, more preferably at most 3 μm, most preferably at most 2 μm. When the surface roughness (Ra) of the insulating layer is at most the above upper limit value, the insulating layer is excellent in the external appearance and the abrasion resistance.

The fluorinated copolymer (A) may have a functional group such as an alkoxy carbonyl group, an alkoxy carboxyloxy group, a hydroxy group, a carboxyl group or a carbonyl fluoride group as a polymer terminal group.

Such a polymer terminal group may be introduced by using the predetermined radical polymerization initiator or chain transfer agent at the time of obtaining the fluorinated copolymer (A) by polymerization.

The radical polymerization initiator may, for example, be tertiary butylperoxy pivalate or perfluorobutyloyl peroxide. The chain transfer agent may, for example, be a chain transfer agent having a functional group such as an ester group, a carbonate group, a hydroxy group, a carboxy group or a carbonyl fluoride group. Specifically, acetic acid, acetic acid anhydride, methyl acetate, ethylene glycol or propylene glycol may be mentioned.

Further, it may be one, of which a polymer terminal group is fluorination-treated for improving the heat stability. The fluorination treatment may be carried out by exposing pellets or a powder of the fluorinated copolymer (A) to hydrogen fluoride gas or fluorine gas, or a terminal may be fluorinated by exposing the fluorinated copolymer (A) to hydrogen fluoride gas or fluorine gas in an extruder at the time of melt-kneading the fluorinated copolymer (A) into pellets by the extruder.

<Additive>

The insulating layer may be consisting of only the fluorinated copolymer (A) or may contain an additive such as a filler for reinforcement, a filler or a pigment in addition to the fluorinated copolymer (A). Even though the insulating layer is consisting of only the fluorinated copolymer (A), the insulating layer is excellent in the abrasion resistance.

The filler for reinforcement is poor in affinity to the fluorinated copolymer (A). Thus, if the filler for reinforcement is added, the filler bleeds out to the surface of the insulating layer at the time of forming an electric wire, and thereby the smoothness of the surface of the electric wire may be impaired. Thus, the insulating layer preferably contains no filler for reinforcement.

In a case where the insulating layer contains an additive, the filler for reinforcement may, for example, specifically be a fibrous filler (such as glass fibers, carbon fibers, boron fibers, aramid fibers, liquid crystal polyester fibers or stainless steel microfibers), or a powdery filler (such as talc, mica, graphite, molybdenum disulfide, polytetrafluoroethylene, calcium carbonate, silica, silica alumina, alumina or titanium dioxide). One or more of these inorganic fillers may be used.

The pigment may, for example, specifically be a coloring pigment such as an organic pigment or an inorganic pigment. Specific examples include carbon black (black pigment), iron oxide (red pigment), aluminum-cobalt oxide (blue pigment), copper phthalocyanine (blue pigment, green pigment), perylene (red pigment) and bismuth vanadate (yellow pigment).

(Ratio of the Thickness (Di) of the Insulating Layer to the Diameter (Dc) of the Conductor)

In the insulated electric wire, the ratio of the thickness (Di) of the insulating layer to the diameter (Dc) of the conductor (Di/Dc) is less than 0.5. Further, Di/Dc is preferably at least 0.05. When Di/Dc falls within the above range, the abrasion resistance of the insulating layer is more excellent, and it is possible to reduce the size and weight of the insulated electric wire.

Further, when Di/Dc is at least 0.2 and less than 0.5, particularly at least 0.2 and at most 0.3, the abrasion resistance of the insulating layer is particularly excellent, such being preferred.

Further, when Di/Dc is at least 0.05 and at most 0.2, particularly at least 0.1 and at most 0.15, by utilizing the excellent abrasion resistance of the insulating layer, it is possible to further reduce the size and weight of the insulated electric wire, such being particularly preferred.

(Applications)

The insulated electric wire of the present invention may be used in various applications such as members for vehicles, medical products, mechanical members and electronic and electron members.

As the vehicle members, for example, a spool valve, a thrust washer, an oil filter, various gears, an ABS part, an AT seal ring, a MT shift fork pad, a bearing, a seal and a crutch ring may be mentioned.

Further, in the present specification, the vehicle includes vehicles having wheels and vehicles similar to them. As the vehicles having wheels, for example, automobiles, airplanes having wheels, trains, locomotives and bicycles may be mentioned. As the vehicles similar to the vehicles having wheels, for example, airplanes having no wheel such as seaplanes and linear motor cars having no wheel may be mentioned. The power source of vehicles may, for example, be an engine, an electronic motor or human power.

The medical product may, for example, be a member for an endoscope such as an endoscopic tube or an endoscopic operating portion.

The mechanical member may, for example, be a printing machine relating member such as a separation claw or a heater holder for a photocopier, a compressor member in an industrial field, a cable in a mass transportation system, a conveyer belt chain, a connector for an oil field development machine or a pump member for a hydraulically powered system.

The electronic and electron member may, for example, be a printed circuit board, a connector, a socket, a relay member, a coil bobbin, an optical pickup, an oscillator, a semiconductor package, a computer relating member, a hard disk relating member, a lens barrel for camera, an optical sensor housing, a compact camera module housing (a package or a lens barrel), a projector optical engine construction member, an IC tray, a semiconductor production process relating member such as a wafer carrier.

Further, an application as an oil-drilling cable may be mentioned. Particularly, a communication cable for a controlling equipment which is distantly positioned from a drilling equipment on ocean bed or on land or an electric power supply cable to a drilling equipment is required to have the durability so as to be used under a high temperature and to be excellent in the abrasion resistance, and thereby the insulated electric wire of the present invention may be used.

Further, in a case where the fluorinated copolymer (A) to be used in the insulated electric wire of the present invention is used as a protective insulating layer surrounding a central core of a cable, and the central core of a cable is preferably an electrical conductor. Otherwise, an optical fiber may be used instead of the electrical conductor.

The fluorinated copolymer (A) to be used in the insulated electric wire of the present invention may be molded to be used in various fields as various members such as an electronic member, an aircraft member or a vehicle member and may be used as a tube, a hose, a tank, a seal or the like. In such a case, the fluorinated copolymer (A) may be used in the form of a laminate with another resin, a metal or the like.

The tube or hose may, for example, be a tube for a coating line or a hose for a coating line, a tube for a chemical liquid or a hose for a chemical liquid, a tube for an agriculture chemical or a hose for an agricultural chemical, a tube for a beverage, a hose for a beverage, a tube for oil pressure or a hose for oil pressure, a tube buried in the earth which is used in a fuel station such as a gas station, a tube for a fuel pipe for an automobile or a hose for a fuel pipe for an automobile, a filler neck hose, a radiator hose for an automobile, a break hose, an air condition hose, an electric wire cable, a hose for a fuel cell, an application for an electronic member, an industrial hose for transporting fruit juice, a paste food or the like, an ink tube, a chemical tube, a pneumatic tube or a pneumatic hose, a hose for transporting fuel such as gasoline, light oil, alcohol or the like or a hose for supplying hot water.

The tank may, for example, be a radiator tank for an automobile, a chemical liquid tank, a chemical liquid bag, a multi-layer bottle for a chemical liquid storage container, a container for a chemical liquid having a strong corrosive property and erosive property such as an acid and an alkali as a chemical liquid for a semiconductor or the like, or a container for a slurry for a polishing material or a container for an urea aqueous solution in a system for reducing NOX by supplying an urea aqueous solution to a diesel engine exhaust gas.

The seal may, for example, be a seal layer for LIB alumilaminate, various seals for an automobile such as an O ring for a fuel pump, a chemical-relating seal such as a pump for a chemical liquid or a seal for a flow meter for various mechanical relating seals such as a seal for an oil pressure instrument.

Further, a multi-layer printed circuit board, a multi-layer monofilament, a circuit or pipe cover conduct (protective conduct), protection of an outdoor part for a building member so-called exterior, building material for an outer wall, an inner layer wall or the like, a rubber hose mandrel core material, a conductor rope, a belt for food machine, a belt for food transportation, a flange gasket for carburetor or a gear may, for example, be mentioned.

Among them, as a multi-layer molded product, a hose or a tube is preferred.

(Another Embodiment)

As the way to use the insulated electric wire, one insulated electric wire having an insulating layer comprising the fluorinated copolymer (A) covering a conductor may be used as it is, or a multi-core electric wire comprising plural insulated electric wires bundled may be used.

The layer structure of the insulated electric wire is not particularly restricted, so long as the insulating layer comprising the fluorinated copolymer (A) covers a conductor. The layer structure of the insulated electric wire may, for example, be a structure wherein the insulating layer comprising the fluorinated copolymer (A) directly covers a conductor or may be a multi-layer structure having at least one intermediate layer made of another insulating layer, a tape, a shielding shield, paper or the like between the conductor and the insulating layer comprising the fluorinated copolymer (A). Further, irrespective of whether the insulating layer comprising the fluorinated copolymer (A) directly covers the conductor or not, it may be a multi-layer structure having at least one layer such as another insulating layer at the outside of the insulating layer.

Further, even in a case where the fluorinated copolymer (A) of the present invention, is used as a sheath material formed on the outside of a multi-core cable or the like, the abrasion resistance is excellent.

[Production Process]

The process for producing the insulated electric wire may be a known process in which a conductor (also called core wire) is covered with a molten fluorinated copolymer (A) to form an insulating layer and is not particularly restricted. The method for producing the insulated electric wire is preferably a process (1) having a covering step of covering a conductor with a molten fluorinated copolymer (A) by means of an electric wire-extrusion molding machine provided with a die. Further, the insulated electric wire is preferably molded by a molding method depending on applications.

(Conductor)

A conductor to be used is not particularly restricted, and for example, one made of the above described material and having the above-described diameter may be used. Further, as the conductor, a commercially available one may be used.

(Fluorinated Copolymer (A))

As the fluorinated copolymer (A), commercially available one may be used, however, for example, one produced by the after-described "Process for producing the fluorinated copolymer (A)" or the like may be used.

<Process for Producing the Fluorinated Copolymer (A)>

The process for producing the fluorinated copolymer (A) is not particularly restricted but is preferably a polymerization method using a radical polymerization initiator. The polymerization method may, for example, be bulk polymerization, solution polymerization using an organic solvent such as a fluorinated hydrocarbon, a chlorinated hydrocarbon, a fluorinated chlorinated hydrocarbon, an alcohol or a hydrocarbon, suspension polymerization using an aqueous medium and as required, an appropriate organic solvent, or emulsion polymerization using an aqueous medium and an emulsifier. Among them, the solution polymerization is preferred.

As the radical polymerization initiator, the temperature at which its half-life is 10 hours, is preferably from 0 to 100° C., more preferably from 20 to 90° C.

Specific examples include azo compounds such as azobisisobutyronitrile, etc., non-fluorinated diacyl peroxides such as isobutyryl peroxide, octanoyl peroxide, benzoyl peroxide, lauroyl peroxide, etc., peroxydicarbonates such as diisopropyl peroxydicarbonate, etc., peroxy esters such as tert-butyl peroxypivalate, tert-butyl peroxyisobutyrate, tert-butyl peroxyacetate, etc., fluorinated diacylperoxides such as a compound represented by $(Z(CF_2)_rCOO)_2$ (wherein Z is a hydrogen atom, a fluorine atom or a chlorine atom, and r is an integer of from 1 to 10), inorganic persulfate compounds such as potassium persulfate, sodium persulfate, ammonium persulfate, etc.

During the polymerization, in order to control MFR of the fluorinated copolymer (A), a chain transfer agent is preferably used.

The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane.

The solvent used in the solution polymerization may, for example, be a perfluorocarbon, a hydrofluorocarbon, a chlorohydrofluorocarbon or a hydrofluoroether. The number of carbon atoms is preferably from 4 to 12.

The perfluorocarbon may, for example, be specifically perfluorocyclobutane, perfluoropentane, perfluorohexane, perfluorocyclopentane or perfluorocyclohexane.

The hydrofluorocarbon may, for example, be specifically 1-hydroperfluorohexane.

The chlorohydrofluorocarbon may, for example, be specifically 1,3-dichloro-1,1,2,2,3-pentafluoropropane.

The hydrofluoroether may, for example, be methyl perfluorobutyl ether, 2,2,2-trifluoroethyl 2,2,1,1-tetrafluoroethyl ether.

The polymerization conditions are not particularly limited, and the polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

(Temperature of Die)

When the above method (1) is employed as the process for producing the insulated electric wire, the temperature of a die at the time of the extrusion molding is preferably at least 320° C. and less than 420° C., more preferably at least 330° C. and less than 400° C.

When the temperature of the die is at least the above lower limit value, the processability is excellent, and when the temperature of the die is less than the above upper limit value, the thermal decomposition of the resin components can be suppressed.

(Draw Down Ratio)

When the above method (1) is employed as the process for producing the insulated electric wire, the draw down ratio (in the present specification, referred to also as "DDR" (abbreviation of draw down ratio)) at the time of draw downing the molten fluorinated copolymer (A) from the die is preferably at least 5 and less than 180, more preferably at least 10 and less than 110.

If the DDR exceeds the above upper limit value, it is difficult to directly cover a conductor with a molten fluorinated copolymer (A) being draw downed from a die, and if DDR is less than the above lower limit value, the inside of the die is filled with the molten fluorinated copolymer (A), and thereby the load of a screw increases, and it is difficult to increase a discharge amount of a fluorinated copolymer (A) having a low MFR.

In the present invention, DDR means a ratio of draw down at the time of draw downing the molten fluorinated copolymer (A) from the die to the conductor and is obtained by the following formula (1):

$$DDR=(DD^2-DT^2)/(dD^2-dT^2) \qquad (1)$$

(DD: the inner diameter of the die, DT: the outer diameter of the nipple, dD: the outer diameter of the insulated electric wire, dT: the outer diameter of the conductor)

[Function and Effect]

According to the present invention, when the content of structural units based on PAVE in the fluorinated copolymer (A) to be contained in the insulating layer is the predetermined amount, and the fluorinated copolymer (A) has the predetermined MFR and the predetermined melting point, an insulated electric wire which is excellent in the abrasion resistance can be obtained, without increasing the thickness of the insulating layer.

It is considered that the above effect is obtained, since the fluorinated copolymer (A) of which the binding force among molecules is sufficiently high, of which the molecular weight is sufficiently large and of which the crystallinity is sufficiently high is used, and thereby the abrasion resistance of the insulating layer is improved.

Specifically, if MFR is lower than the lower limit value of the present invention, the processability deteriorates, and it is difficult to mold an insulating layer having a small surface roughness. On the other hand, if MFR is higher than the upper limit value of the present invention, the binding force among molecules deteriorates due to the high molecular weight of the fluorinated copolymer (A).

Further, if the content of the structural units based on PAVE is lower than the lower limit value of the present invention, the crystallinity becomes low, and thereby the abrasion property and the mechanical strength deteriorate.

EXAMPLES

[Fluorinated Copolymer]

The fluorinated copolymers used in Examples are mentioned below. Here, all of the fluorinated copolymers have structural units based on PPVE as the structural units based on PAVE.

(A)-1: PFA (Fluon (registered trademark of Asahi Glass Company, Limited) "P-63P" (melting point: 310° C., MFR: 13.5, the content of units based on PPVE: 1.5 mol % to the total structural units))

(A)-2: PFA (Fluon (registered trademark of Asahi Glass Company, Limited) "P-65P" (melting point: 310° C., MFR: 4.5, the content of units based on PPVE: 1.5 mol % to the total structural units))

(A)-3: PFA (Fluon (registered trademark of Asahi Glass Company, Limited) "P-66P" (melting point: 310° C., MFR: 2.1, the content of units based on PPVE: 1.5 mol % to the total structural units))

(A)-4: PFA (Fluon (registered trademark of Asahi Glass Company, Limited) "P-63P" (melting point: 307° C., MFR: 12.0, the content of units based on PPVE: 1.63 mol % to the total structural units))

(A')-1: PFA (Fluon (registered trademark of Asahi Glass Company, Limited) "P-63P" (melting point: 312° C., MFR: 15.5, the content of units based on PPVE: 1.5 mol % to the total structural units))

(A')-2: PFA (Fluon (registered trademark of Asahi Glass Company, Limited) "P-62XP" (melting point: 305° C., MFR: 28.6, the content of units based on PPVE: 2.0 mol % to the total structural units))

[Evaluation Method]

Regarding the fluorinated copolymers as the materials and the obtained insulated electric wires in the after-mentioned Examples 1 to 6 and Comparative Examples 1 to 5, respective evaluations were carried out by the following procedures.

(Composition of the Copolymer)

The composition of each fluorinated copolymer was calculated from data obtained by the measurement by the infrared absorption spectrum analysis.

(Melting Point)

The melting point (Tm) of each fluorinated copolymer was obtained by using a thermal analyzer "EXSTAR DSC7020" (manufactured by Seiko Instruments Inc.), and the melting peak at the time of raising the temperature at a rate of 10° C./min, was recorded, and a temperature corresponding to the maximum value which is the top peak temperature (° C.) was taken as the melting point.

(MFR (g/10 min))

The mass (g) of the fluorinated copolymer flowing out in 10 minutes from a nozzle having a diameter of 2 mm and a length of 8 mm under a load of 49 N was measured by using a melt indexer (manufactured by Takara Thermistor Ltd.) The measuring temperature was set to 372° C.

(Abrasion Resistance (Scrape Abrasion Resistance))

An obtained electric wire was cut into a length of 2 m as a sample to be tested, and using "Magnet wire abrasion tester (reciprocating)", product name, manufactured by Yasuda Seiki Seisakusho, Ltd., a scrape abrasion test was carried out by the test method in accordance with ISO 6722-1 to measure the abrasion resistance. Specifically, the test was conducted under conditions of needle diameter: 0.45±0.01 mm, needle material: SUS 316 (JISK G7602-compliant), abrasion distance: 15.5±1 mm, abrasion rate: 55±5 times/min, load: 7N, and test environment: 23±1° C. The abrasion resistance is represented by a number of reciprocation times of the needle required until the core wire is exposed from the insulating covering by the reciprocating motion of the needle. The more the abrasion resistance (number of times), the better the abrasion resistance of the wire covering material.

(Surface Roughness (Ra))

The surface roughness (Ra) (μm) of the surface of the insulated electric wire (insulating layer) was measured by using a surface roughness measuring instrument (Surfcorder SE-30H, manufactured by Kosaka Laboratory Ltd.) under the following condition. Further, in the calculation of Ra, the measuring point was carried out with n=3, and as its average value was taken as Ra, the calculation was carried out.

Cut off value (λc): 0.25 mm, driving rate: 0.1 mm/sec, sample length: 8 mm

Examples 1 to 5

A conductor (twisted wire, core wire diameter: 1.8 mm, construction: 37/0.26 mm or twisted wire, core wire diameter: 0.9 mm, construction 19/0.18 mm) manufactured by Yasuda Kogyo Co., Ltd. was used.

As the fluorinated copolymer (A), the fluorinated copolymer (A)-1, (A)-2, (A)-3 or (A)-4 was used. MFR, the content of PPVE and the melting point of the fluorinated copolymers are shown in Table 1.

An insulated electric wire was obtained by using an electric wire-extruder having the following construction under the condition mentioned in Table 1 and by using the above conductor and fluorinated copolymer so that the thickness accuracy of the diameter of the electric wire would be ±0.03 mm.

Electric wire-extruder: MS30-25 extruder, manufactured by IKG Corporation

Screw: Full flight, manufactured by IKG corporation, L/D (L: the length from a part beginning of screw flight at the bottom of a hopper hole to the tip part, D: screw diameter)=24, D: screw diameter=30 mm Wire dice cross head: manufactured by Unitek, maximum conductor diameter: 3 mm, maximum die pore diameter: 20 mm Wire take-machine, winder: manufactured by Hijiri Manufacturing Ltd.

The production conditions in Examples 1 to 5 and evaluation results of the obtained insulated electric wires are shown in Table 1.

Further, in Table 1 (after-mentioned Table 2 and Table 3), the "content of PPVE" means a content of structural units based on PPVE per the total structural units in the fluorinated copolymer. Further, "Di" means the thickness of the insulating layer, and "Dc" means the diameter of the conductor.

TABLE 1

| Example | Fluorinated copolymer | MFR (g/10 min) | Content of PPVE (mol %) | Melting point (° C.) | Di (mm) | Dc (mm) | Di/Dc | DDR | Temperature of die (° C.) | Ra (μm) | Scrape abrasion (times) |
|---|---|---|---|---|---|---|---|---|---|---|---|
| 1 | (A)-1 | 13.5 | 1.5 | 310 | 0.5 | 1.8 | 0.28 | 16 | 350 | 0.414 | 15,555 |
| 2 | (A)-2 | 4.5 | 1.5 | 310 | 0.5 | 1.8 | 0.28 | 16 | 360 | 0.341 | 36,691 |
| 3 | (A)-3 | 2.1 | 1.5 | 310 | 0.5 | 1.8 | 0.28 | 16 | 360 | 0.824 | 19,025 |
| 4 | (A)-1 | 13.5 | 1.5 | 310 | 0.5 | 1.8 | 0.28 | 16 | 325 | 1.260 | 15,102 |
| 5 | (A)-4 | 12 | 1.6 | 310 | 0.5 | 1.8 | 0.28 | 16 | 350 | 0.470 | 13,540 |

Comparative Examples 1 to 4

An insulated electric wire was obtained in the same procedure as in Examples 1 to 4, except that the fluorinated copolymer (A)-1, (A)-2, (A')-1 or (A')-2 was used, and the condition mentioned in Table 2 was employed.

The production conditions in Comparative Examples 1 to 4 and evaluation results of the obtained insulated electric wires are shown in Table 2. Further, in Comparative Examples 3 and 4, the surface roughness (Ra) and the scrape abrasion could not be measured, since the flowability was poor, and thereby the conductor could not be covered.

TABLE 2

| Comparative Example | Fluorinated copolymer | MFR (g/10 min) | Content of PPVE (mol %) | Melting point (° C.) | Di (mm) | Dc (mm) | Di/Dc | DDR | Temperature of die (° C.) | Ra (μm) | Scrape abrasion (times) |
|---|---|---|---|---|---|---|---|---|---|---|---|
| 1 | (A')-1 | 15.5 | 1.5 | 310 | 0.5 | 1.8 | 0.28 | 16 | 350 | 0.360 | 6,159 |
| 2 | (A')-2 | 28.6 | 2 | 305 | 0.5 | 1.8 | 0.28 | 16 | 350 | 0.165 | 5,982 |
| 3 | (A)-1 | 13.5 | 1.5 | 310 | 0.5 | 1.8 | 0.28 | 16 | 315 | — | — |
| 4 | (A)-2 | 4.5 | 1.5 | 310 | 0.1 | 0.9 | 0.28 | 189 | 350 | — | — |

It is evident from the evaluation results in Table 1 and Table 2 that when Di/Dc was 0.28, and DDR was 16, the insulated electric wires in Examples 1 and 4 where MFR was 13.5, in Example 2 where MFR was 4.5, in Example 3 where MFR was 2.1 and in Example 5 where MFR was 12.0 had a superior abrasion resistance (scrape abrasion) to the insulated electric wires in Comparative Examples 1 where MFR was 15.5 and in Comparative Example 2 where MFR was 28.6.

In a case where a covered electric wire was produced by using the fluorinated copolymer (A)-1, the conductor could be covered in Example 1 where the temperature of the die at the time of extrusion molding was 350° C. and in Example 4 where the temperature was 325° C. On the other hand, the conductor could not be covered in Comparative Example 3 where the temperature was 315° C.

Further, in a case where the covered electric wire was produced with the fluorinated copolymer (A)-2, the conductor could be covered in Example 2 where DDR was 16. On the other hand, the conductor could not be covered in Comparative Example 4 where DDR was 189.

Example 6 and Comparative Example 5

Insulated electric wires in Example 6 and Comparative Example 5 were obtained in the same procedure as in Examples 1 to 4, except that the conditions were changed to the conditions mentioned in Table 3.

The production conditions in Example 6 and Comparative Example 5 and evaluation results of the obtained insulated electric wires are shown in Table 3.

TABLE 3

| | Fluorinated copolymer | MFR (g/10 min) | Content of PPVE (mol %) | Melting point (° C.) | Di (mm) | Dc (mm) | Di/Dc | DDR | Temperature of die (° C.) | Ra (μm) | Scrape abrasion (times) |
|---|---|---|---|---|---|---|---|---|---|---|---|
| Example 6 | (A)-1 | 13.5 | 1.5 | 310 | 0.1 | 0.9 | 0.11 | 102 | 350 | 0.257 | 23 |
| Comparative Example 5 | (A')-1 | 15.5 | 1.5 | 310 | 0.1 | 0.9 | 0.11 | 102 | 350 | 0.066 | 1 |

It is evident from the evaluation results in Table 3 that even in a case where the values of the Di and Dc were reduced so that the covered electric wire would be thin entirely, and Di/Dc was lowered in order to reduce the thickness of the covered electric wire as compared with Examples 1 to 5 and Comparative Examples 1 and 2, the insulated electric wire in Example 6 where MFR was 13.5 had a superior abrasion resistance (scrape abrasion) to Comparative Example 5 where MFR was 15.5.

INDUSTRIAL APPLICABILITY

The insulated electric wire of the present invention can be used for various applications in broad ranges such as members for vehicles, medical products, mechanical members and electronic/electron members.

This application is a continuation of PCT Application No. PCT/JP2015/073405, filed on Aug. 20, 2015, which is based upon and claims the benefit of priority from Japanese Patent Application No. 2014-173139 filed on Aug. 27, 2014. The contents of those applications are incorporated herein by reference in their entireties.

What is claimed is:

1. An insulated electric wire comprising a conductor and an insulating layer covering the conductor, wherein the insulating layer comprises a fluorinated copolymer (A) having units based on tetrafluoroethylene and units based on a perfluoroalkyl vinyl ether, the content of the units based on a perfluoroalkyl vinyl ether is from 0.1 to 1.9 mol % to the total units in the fluorinated copolymer (A); MFR of the fluorinated copolymer (A) as measured by the method in accordance with ASTM D-3307 is from 0.1 to less than 15; the melting point of the fluorinated copolymer (A) is at least 260° C.; and the ratio of the thickness Di of the insulating layer to the diameter Dc of the conductor (Di/Dc) is less than 0.5, wherein the surface roughness (Ra) of the insulating layer is at most 10 μm the insulating layer comprising the fluorinated copolymer (A) directly covers the conductor; and the insulating layer is formed by covering the conductor with a molten fluorinated copolymer (A) by means of an electric wire-extrusion molding machine provided with a die.

2. The insulated electric wire according to claim 1, wherein the perfluoroalkyl vinyl ether is a perfluoropropyl vinyl ether.

3. The insulated electric wire according to claim 1, wherein the surface roughness (Ra) of the insulating layer is at most 5 μm.

4. The insulated electric wire according to claim 1, wherein the content of the units based on a perfluoroalkyl vinyl ether is from 1.0 to 1.9 mol % to the total units in the fluorinated copolymer (A).

5. The insulated electric wire according to claim 1, wherein the ratio of the thickness Di of the insulating layer (Di/Dc) is at least 0.2 and less than 0.5.

6. The insulated electric wire according to claim 1, wherein the ratio of the thickness Di of the insulating layer (Di/Dc) is at least 0.05 and at most 0.2.

7. The insulated electric wire according to claim 1, which is used as a member for a vehicle.

8. A process for producing the insulated electric wire as defined in claim 1, wherein the temperature of the die is at least 320° C. and less than 420° C.

9. The process according to claim 8, wherein when draw downing the molten fluorinate copolymer (A) from the die to the conductor, the draw down ratio (DDR) is at least 5.0 and less than 180.

* * * * *